US006307715B1

(12) United States Patent
Berding et al.

(10) Patent No.: US 6,307,715 B1
(45) Date of Patent: Oct. 23, 2001

(54) HEAD SUSPENSION HAVING REDUCED TORSIONAL VIBRATION

(75) Inventors: Keith R. Berding, San Jose; Kenneth F. Young, Sunnyvale, both of CA (US)

(73) Assignee: Read-Rite Corporation, Fremont, CA (US)

( * ) Notice: Subject to any disclaimer, the term of this patent is extended or adjusted under 35 U.S.C. 154(b) by 694 days.

(21) Appl. No.: 08/705,798

(22) Filed: Aug. 30, 1996

(51) Int. Cl.[7] ........................................................ G11B 5/48
(52) U.S. Cl. .................................................... 360/244.8
(58) Field of Search ................................ 360/103, 104, 360/105, 106, 244.8, 244.2

(56) References Cited

U.S. PATENT DOCUMENTS 5,126,904 * 6/1992 Sakurai ................................. 360/104
5,313,535 * 5/1994 Kohso et al. ......................... 360/104

FOREIGN PATENT DOCUMENTS 59-213066 * 12/1984 (JP) ..................................... 360/104
63-234470 * 9/1988 (JP) ..................................... 360/104
4-181575 * 6/1992 (JP) ..................................... 360/104

* cited by examiner

*Primary Examiner*—David Davis
(74) *Attorney, Agent, or Firm*—Mark Lauer

(57) ABSTRACT

A transducer suspension for a drive system has a beam which is bendable in a vertical direction for holding the transducer adjacent to the media, but is torsionally stiff for quicker access times and reduced noise and errors. This inherently contradictory performance occurs by joining a laterally elongated brace which is torsionally stiff about its elongated dimension across a pair of laterally disposed strips to cause the strips to flex in unison, allowing bending but reducing torsional motion in the suspension about an axis which is substantially perpendicular to the torsionally stiff axis of the brace. The torsionally stiff brace may take the form of a tube having a rectangular, triangular or circular cross-section, and may be formed of material cut from the suspension to define the hinge strips. The brace may have reduced longitudinal dimensions at the connections to the strips to further filter torsional versus bending vibrations. A plurality of braces joined to hinge portions may also occur in a single suspension for increased effect.

18 Claims, 4 Drawing Sheets

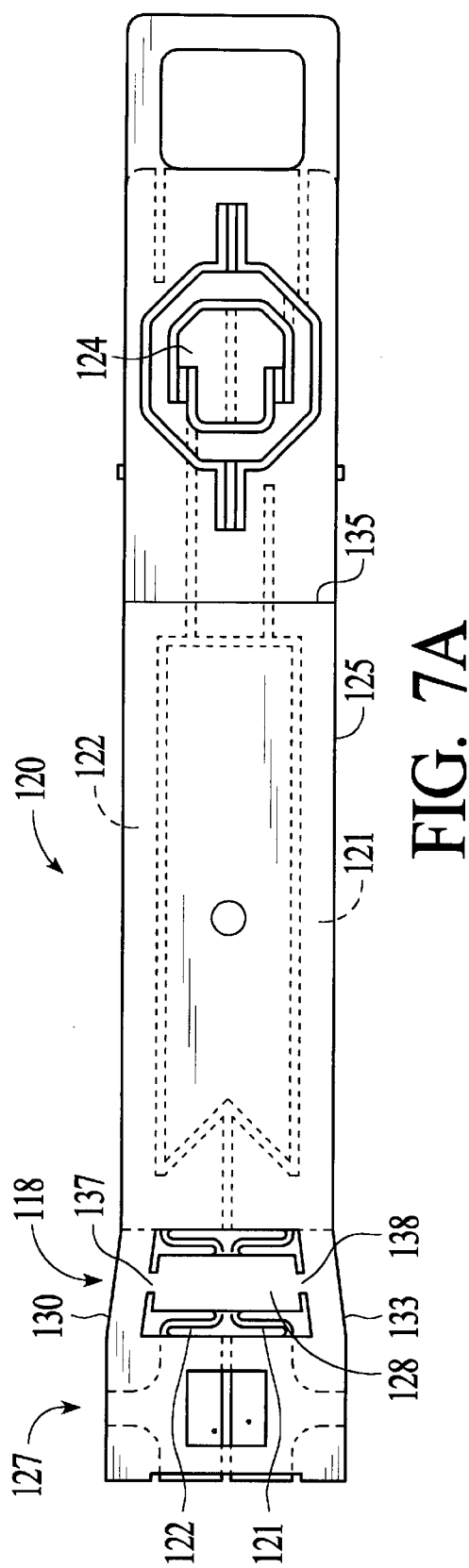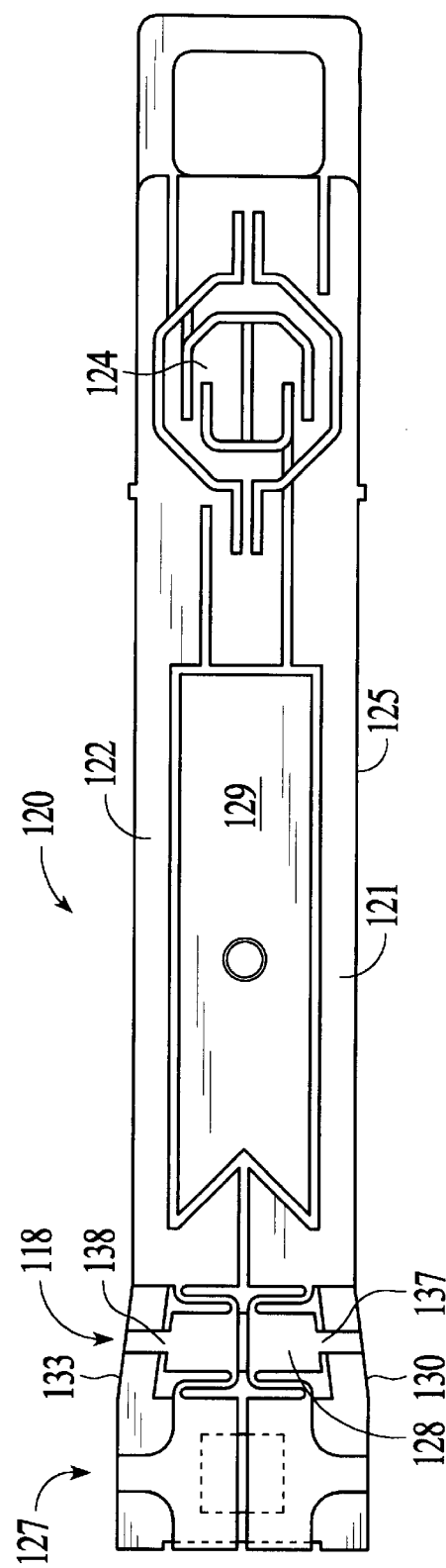
FIG. 7A
FIG. 7B

HEAD SUSPENSION HAVING REDUCED TORSIONAL VIBRATION

TECHNICAL FIELD

The present invention relates to suspensions for transducers that are held in close proximity to relatively moving media, particularly for load beams holding disk drive heads.

BACKGROUND OF THE INVENTION

Information storage drive systems often operate by holding an electromagnetic transducer or head next to a relatively moving magnetic media, such as a disk or tape. The media typically moves in a single direction, so that a stationary transducer can read or write bits of data on a single track that passes next to the transducer, while the employment of a transducer that can move in a direction transverse to the media motion allows access to multiple tracks. Such moveable transducers are commonly attached near distal ends of suspensions in order to facilitate access to various tracks. It is important that a suspension accurately position the transducer along as well as across a recording track in order to eliminate errors and reduce noise.

In order to provide such accurate positioning, a suspension load beam is typically stiff in both lengthwise ("longitudinal") and sideways ("lateral") directions, which are both oriented substantially parallel to the plane of the media. Lateral and longitudinal stiffness affords rapid access of a head to various tracks of the media, reduces settling time and increases the ability of the head to follow a single track, all essential to increased drive performance. Stiffness in a given direction of a beam generally correlates with high resonant vibration frequencies of the beam in vibration modes corresponding to those directions, so a greater stiffness or flexibility can be translated into, respectively, a higher or lower resonant vibration frequency. In other words, high resonant vibration frequencies generally reduce positioning error, as perturbations such as may be induced by transducer movement between tracks do not result in large position errors and are quickly diminished, allowing the transducer to accurately read or write.

On the other hand, flexibility of a beam in a direction toward and away from the media, which is termed the "vertical" or "perpendicular" direction in the present invention, is generally desirable to allow the transducer to conform to variations in media height or positioning and to provide a spring force for holding the transducer next to the media, which may include controlling fly height. This bending is typically achieved by creating a spring or hinge portion near a base or mounting end of the beam. Flexibility in the vertical direction, however, may allow undesirable low-frequency resonant vibrations to occur in a torsional mode, since torsional vibration can occur when laterally spaced portions of the beam bend in opposite vertical directions. A torque on the beam is generally induced with any lateral acceleration, which occurs for instance when the head shifts between tracks, since the center of mass of the head is not aligned with the torsional axis of the beam or gimbal. There is a fundamental conflict between the need to allow vertical bending of the beam and the need to reduce the amplitude of torsional vibrations, since the torsional vibrations are simply vertical bending in which one side of the beam is out of phase with the other. These torsional vibrations can cause significant off-track motion leading to noise and errors in reading and/or writing data, and impeding any reduction in transducer access time between tracks.

An object of the present invention is to provide means for preferentially increasing torsional stiffness of a transducer suspension without reducing the vertical bending flexibility.

SUMMARY OF THE INVENTION

The above object is achieved by providing, in at least one place along the length of a drive system arm or beam, a laterally extensive region of vertical flexibility, commonly termed a "hinge" region, with a laterally extending brace joined to a longitudinally limited portion of the hinge. Although the purpose of the brace is to mitigate twisting of the beam about a longitudinal beam axis, the brace itself is stiff against twisting about a lateral axis. This lateral torsional stiffness of the brace prevents the vertically flexible region attached to the brace from simultaneously bending upward on one side of the beam and downward on the other, thereby increasing longitudinal torsional stiffness. At the same time, overall bending of the beam is decreased only along the small portion of the length joined to the laterally extending brace, allowing the beam to provide a relatively soft spring force holding the transducer adjacent the media.

The reason for the success of this invention can be understood by comparing the bending and twisting motions that are possible with a generally planar, flexible yet resilient structure, such as a sheet of metal. Bending of such a structure along a given line in the plane does not cause bending along a perpendicular line in the plane but instead tends to prevent such perpendicular bending. In contrast to bending motion, however, torsional motion about a given line in the plane causes torsional motion about a second perpendicular line in the plane. Reducing torsional motion about an axis can thus be accomplished by reducing torsional motion about a perpendicular axis. A brace that is torsionally stiff about a first direction but limited in length in a second, perpendicular direction can therefore limit torsional flexibility about the second direction without substantially limiting bending along the second direction.

Several types of torsionally stiff braces may be employed to raise the torsional frequency of a suspension beam. Torsional stiffness is caused by resistance to motion about a torsional axis, and thus benefits from a structure having shear strength that is distanced to the axis, the distance providing a moment arm that leverages the strength. In general, a tube-like structure offers high torsional stiffness per unit weight, since a tube has a high shear strength at a distance from its axis but no mass at the axis. Such a tube, extending laterally across a beam, may be joined to a hinge for reducing torsional vibrations in a perpendicular, longitudinal direction. The tube may be cylindrical, offering a high torsional stiffness and a minimal reduction in bendable length along a joined area. Alternatively, a tube may have rectangular or triangular cross-sections which afford greater attachment area, providing more assuredly reduced torsional vibration at a cost of greater non-bendable length. On the other hand, for a multilayer beam having a hinged area formed by a cutout in a layer or layers, a laterally-extending, longitudinally-limited brace may be formed across the hinge by folding the cutout layers and/or leaving the multilayers. The brace should be formed of a material having a matching thermal expansion coefficient as the hinge in order to avoid temperature induced changes in the spring-like hinge, such matching being inherent when a layer is folded back on itself to form the brace.

The brace, the hinge and the entire beam may alternatively be formed of materials micromachined with semiconductor processing techniques, such as etched silicon with embedded or deposited conductive leads for connecting the transducer with drive electronics. Materials such as silicon (Si), silicon carbide (SiC), silicon dioxide ($SiO_2$), alumina ($Al_2O_3$) or other strong, workable substances may be used in this case. A stainless steel or other metal suspension beam may also be etched to form hinge strips or deposited with additional layers for a laminated brace, for example. Alternatively, a laminated brace including a plurality of rolled or pressed metal layers may be formed by metal working such as cutting, stamping, bonding and/or welding, such as laser spot welding.

A plurality of such laterally extending braces adjoined by vertically flexible regions can be formed along a suspension beam to increase the vertical flexibility, with the provision that such segmentation should not be periodic in order to avoid creating resonant structures. Also, due to the improved performance provided by the torsionally stiff brace, the beam can be tailored to further reduce torsional vibrations by increasing its torsional stiffness in areas not selected for vertical bending, improvements which would not have been noticeable otherwise in relation to hinge induced vibrations.

BRIEF DESCRIPTION OF THE DRAWINGS

FIG. 7A is a view of a non-disk-facing side of a disk drive suspension including a pair of bendable hinge strips connected by a torsionally stiff brace which has a reduced longitudinal dimension adjoining the strips to allow greater bending motion of the strips.

FIG. 7B is a view of the disk-facing side of the suspension of FIG. 7A, including integral electrical conductors.

DESCRIPTION OF THE INVENTION

Figure 1:
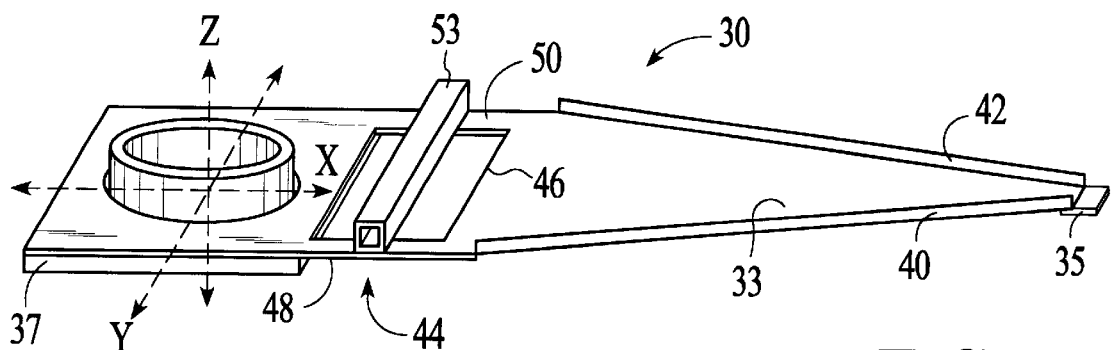
FIG. 1 is a perspective view of a torsionally stiff brace traversing a flexible hinge to create a bendable yet torsionally stiff suspension of the present invention.

Referring now to FIG. 1, a suspension 30 for a hard disk drive transducer 35 includes a "load beam" 33 holding the transducer near a distal end, and a baseplate 37 for attaching the beam to a rotary actuator arm. The beam 33 is designed to generally pivot about an actuator axis which is parallel to the Z direction shown and substantially normal to a major surface of a disk, not shown, over which the transducer 35 glides or slides, in order to access various tracks on the disk. The beam 33 is elongated along an X direction and also extends substantially along a lateral or Y direction, the X and Y extensions of the beam resulting in stiffness in those directions and thereby providing accurate positioning of the transducer 35 on the disk surface in the X and Y directions. The beam 33 is thinnest in the Z direction, to allow bending toward and away from the disk and to provide a relatively soft and accurately controlled spring force for holding the transducer 35 adjacent to the disk. The beam 33 may be made of stainless steel having a thickness of a few mils, or other resilient materials, and has a tapered width that is generally greater closer to the base plate 37 and lesser adjacent to the transducer 35. A pair of flanges 40 and 42 are formed by rolling edges of the tapered portion of the beam 33, the flanges stiffening that portion against bending in the Z direction, which also reduces torsional (twisting) motion of that portion about the X direction, since such torsional motion involves bending of laterally offset parts of the beam in opposite Z directions.

A hinge region 44 is formed by the thin, unflanged portion of the beam 33 close to the baseplate 37, which has been cut out at opening 46 to further decrease resistance to bending in the Z direction, while maintaining a pair of laterally spaced strips 48 and 50, which maintain X and Y direction stiffness. The sum of the lateral or Y dimensions of the strips 48 and 50 is termed the "active width" of the hinge 44. The hinge 44 may provide a force holding the transducer adjacent to the disk, which in disk drive industry jargon is termed a "load" or "preload" and is measured in units of "grams," where a "gram" is the force produced by a 1 gram mass in standard gravity. Since the beam 33 is most flexible in the hinge region 44, this region provides the primary contribution to both bending and torsional motion. A brace 53 spans the opening 46 and is joined near a middle of strips 48 and 50 so as to leave a substantial portion of the strips free on either side of the brace. The brace 53 extends much further in the Y direction than in either the X or Z direction, and has been designed to be torsionally stiff (against twisting) about the Y direction. The brace 53 in this embodiment is hollow for reduced mass and has a rectangular cross-section in an X–Z plane. Since the brace 53 severely restricts motion about its Y axis, the strips 48 and 50 are similarly constrained, essentially preventing each strip from sloping oppositely in the X–Z plane from the other strip and thereby minimizing torsional motion of the beam 33. Due to the limited extent of the brace 53 in the X direction, however, needed Z direction bending of the hinge is not significantly constrained. Moreover, a reduction in Z direction bending can be compensated for by increasing the length of the strips 48 and 50 in the X direction to achieve a desired spring constant.

Figure 2:
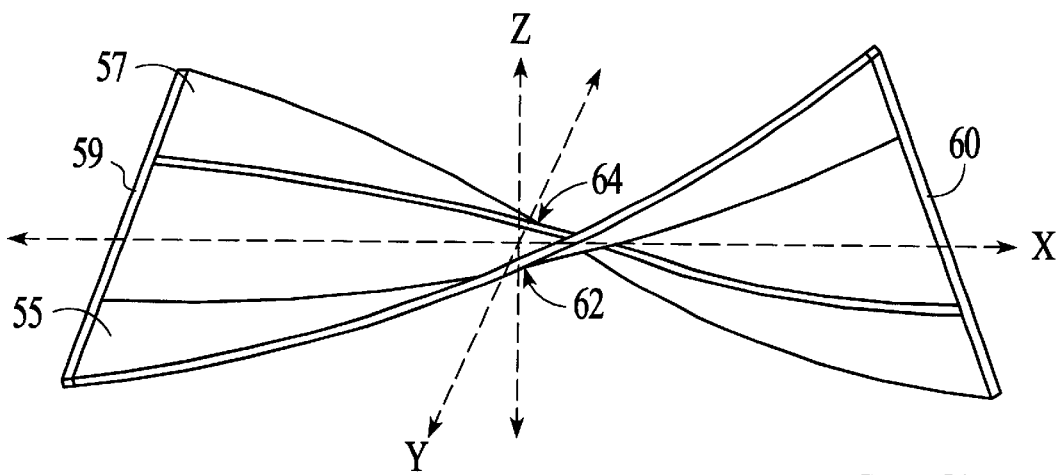
FIG. 2 is a perspective view of a simplified hinge region of the prior art undergoing torsional motion.

In order to better illustrate the surprising results of the present invention, FIG. 2 shows a pair of flexible, resilient strips 55 and 57 which extend primarily along the X direction between a pair of rigid bars 59 and 60, the strips and bars representing a simplified hinge region of the prior art. In an unperturbed state, the strips 55 and 57 would be parallel to each other, as would the bars 59 and 60. The strips 55 and 57, which are free to bend in the Z direction, are shown twisting about the X direction due to a torque on bar 60 relative to bar 59. Note that this torsional motion about the X direction also causes a twisting of strips 55 and 57 about the Y direction in parts of the strip far from the bars 59 and 60. Thus a portion 62 of strip 55 disposed about midway between bars 59 and 60 is seen to slope upward while a corresponding portion 64 of strip 57 is seen to slope downward. Preventing such torsional motion of the portions 62 and 64 about the Y direction would therefore prevent the torsional motion about the X direction depicted in FIG. 2. The present invention is directed to preventing this X direction torsion with a brace extending along and torsionally stiff about the Y direction, provided that the brace does not extend so far in the X direction so as to prevent bending of the strips in the Z direction.

Application of some engineering formulas can also be used to understand the current invention. The twisted strips 55 and 57 of FIG. 2 must each act like a beam with one end fixed and one end guided so as to have equal slopes at their ends, as required by rigid bar 60. A governing equation for this condition is:

$$y = PL^3/12EI,$$

where y is the vertical deflection, P is the applied load, L is the beam length, E is the elastic modulus, and I is the area moment of inertia of the beam cross-section. In addition, the twist of each leg is given by:

$$\theta = TL/KG,$$

where $\theta$ is the angular deflection, T is the applied torque, L is the beam length, G is the shear modulus, and K is the stiffness constant for a rectangular section. For the geometry shown in FIG. 2, the torsional stiffness of the hinge is given by:

$$S = T/\theta = 2KG/L + 2A^2 12EI/L^3,$$

where S is the torsional stiffness and A is the arm from load beam rotation to the center of the leg.

In considering the torsional stiffness of the hinge, note that most variables are linearly related to S, while A and L are nonlinearly related. If A becomes larger, meaning that the width of the hinge is increased, then the stiffness increases as a square of the width. The most dramatic effect on torsional stiffness, however, is due to changing the hinge length L, since the stiffness is essentially a cubic function of the length. The bending spring constant also increases at a higher than linear rate, however, the bending spring constant is a substantially linear function of hinge length if the stiff load beam portion is significantly longer than the hinge portion. A temptation arises to increase torsional stiffness by simply decreasing hinge length. But as hinge length decreases, either material thickness or active width must decrease in order to provide a given suspension stiffness, or "spring rate". Decreasing material thickness affects load beam design, manufacturing processes, suspension robustness, and increases stress on the hinge. Decreasing active width similarly increases stress levels of the hinge. For a given spring rate and gram load, the following hinge equations are applicable:

$$\sigma = mc/I; \ c = h/2; \text{ and } I = bh^3/12;$$

where $\sigma$ is the stress, m is the moment (force/length of load beam), b is the active width, h is the material thickness, I is the area moment of inertia, and c is the length from a neutral axis to an outermost fiber. Solving the above equations yields:

$$\sigma = m\,(h/2)/(bh^3/12) = 6m/bh^2.$$

In other words, decreasing thickness h increases stress $\sigma$ at a squared rate. Thus, attempting to increase torsional stiffness by decreasing the length of the hinge while maintaining a desired spring constant also increases stress levels, which may lead to failure of the hinge. On the other hand, the addition of a torsionally stiff brace such as element 53 in FIG. 1 may divide the length L roughly in half and thereby increase the torsional stiffness in each half dramatically, while the bending stiffness is decreased only by the reduction in length occupied by the brace.

Figure 3:
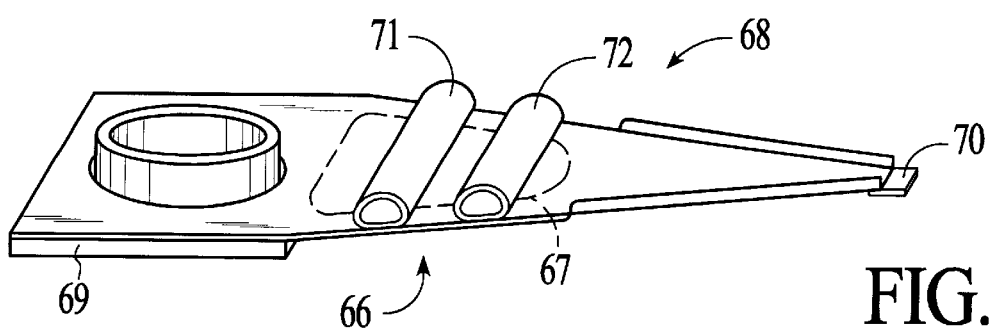
FIG. 3 is a perspective view of an alternate embodiment a pair of somewhat cylindrical braces of the present invention bonded across a flexible, tapered leaf spring.

FIG. 3 illustrates an alternate embodiment in which a suspension 68 for a transducer 70 is formed of a continuous sheet of metal such as steel with a generally triangular shape, with a hinge region 66 adjacent to a baseplate 69. A generally triangular cutout 67 may optionally be formed for added flexibility of the hinge region 66. A pair of torsionally stiff braces 71 and 72 are formed of a generally cylindrical tube which may be made of steel or other strong materials and which has been cut to a length matching the hinge. The braces 71 and 72 have been crimped slightly to broaden the interfaces between the braces and the hinge 66 where the braces and hinge are joined by gluing, welding or other bonding techniques. An adhesive used for bonding braces 71 and 72 to hinge 66 may additionally serve as damping material to reduce vibrations. A generally cylindrical and hollow tube such as brace 71 or 72 is believed to offer a high torsional stiffness and a low reduction in overall bending length of the hinge 66. The pair of braces 71 and 72 joined to hinge areas each act as vibrational filters for the suspension, allowing low frequency bending vibrations while reducing low frequency torsional vibrations.

Figure 4:
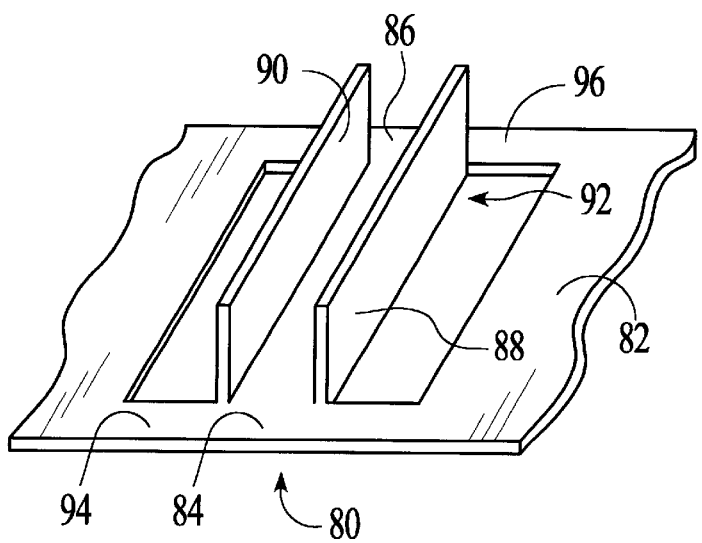
FIG. 4 is a cutaway perspective view of an alternate of a suspension beam including a pair of flexible hinge strips joined by a torsionally stiff, flanged brace formed by material cut out from the strips.

FIG. 4 focuses on a hinge region 80 of another embodiment of the present invention, which is formed by making a pair of somewhat U-shaped cuts in a resilient planar sheet 82, the cuts tracing a generally rectangular outline and separated by small uncut regions 84 and 86. The flaps 88 and 90 of the sheet 82 within the U-shaped cuts are then bent upward for increased rigidity against Z direction bending, forming a torsionally stiff brace 92 spanning most of the hinge region 80.

Figure 5:
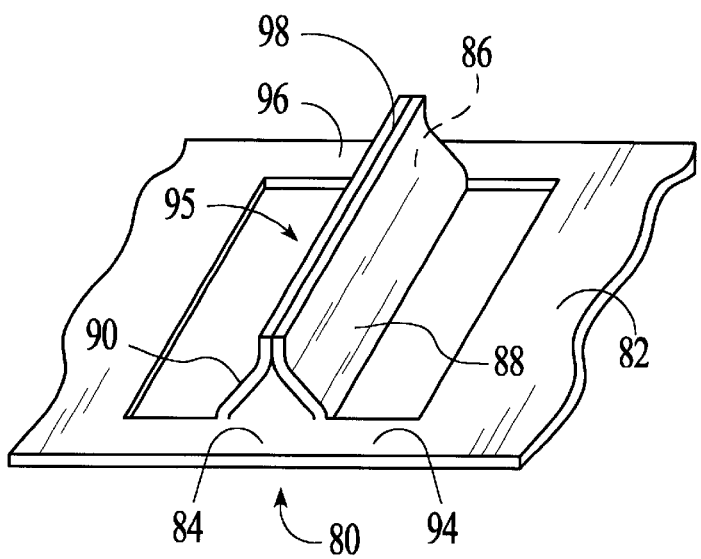
FIG. 5 is a cutaway perspective view of an alternate embodiment of a suspension beam including a pair of flexible hinge strips joined by a torsionally stiff, generally triangular brace formed by material cut out from the strips.

FIG. 5 shows an embodiment in which the flaps 88 and 90 of the sheet 82 within the U-shaped cuts are folded together to form a generally triangular, torsionally stiff brace 95 that separates the thin strips 94 and 96 which act as hinges. The flaps 88 and 90 are bonded together along a ridge 98 by gluing, welding, soldering or other known bonding methods. Laser welding along ridge 98 is a preferred bonding method. Although the brace 92 in this example does not join all of the bendable material of flaps 94 and 96, the brace offers a rigid boundary to those flaps that discourages torsional motion about an axis perpendicular to the length of the brace.

Figure 6:
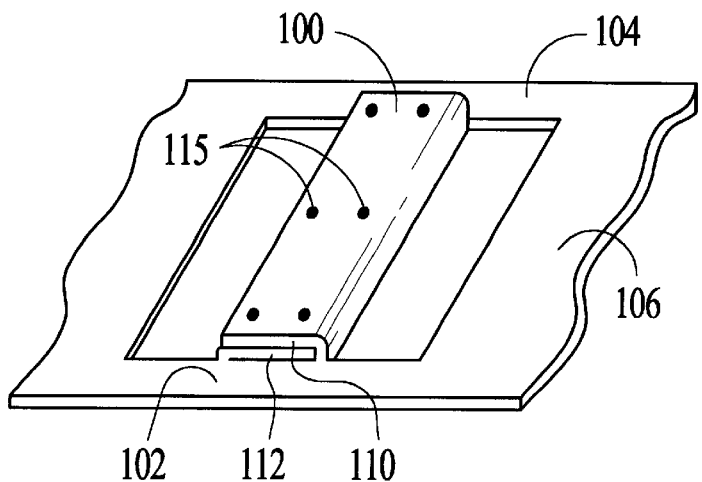
FIG. 6 is a cutaway perspective view of an alternate embodiment of a suspension beam including a pair of flexible hinge strips joined by a torsionally stiff, laminated brace formed by material cut out from the strips.

In FIG. 6, another embodiment of a torsionally stiff brace 100 spanning a pair of flexible hinge strips 102 and 104 is formed, like the embodiment depicted in FIG. 4, by making a pair of somewhat U-shaped cuts in a resilient planar sheet 106, the cuts tracing a generally rectangular outline and separated by small uncut regions, although in this example the cuts differ slightly in longitudinal extent. A pair of flaps 110 and 112 defined by the cuts are then folded over an uncut region between the cuts and on top of each other to form the trilayer brace 100. A number of laser welding spots 115 join the flaps 110 and 112 together, which can alternatively be overlapped to form a tube shaped brace, similar to that shown in FIG. 3. As before, the brace is designed to preferentially reduce torsional motion about an axis of the planar sheet 106 transverse to the elongated brace, particularly for the situation in which the sheet is part of a suspension for a drive system transducer.

FIGS. 7A and 7B show a hinge region 118 of a laminated, wireless suspension 120 for a drive system which has a mostly planar beam 125 extending between a mounting area 127 and a head platform 124. This suspension 120 is designed to work with an ultralight contact head, not shown, which is conductively bonded to the head platform 124, while the mounting area 127 attaches to a rotary actuator via an adapter, also not shown. The suspension 120 is formed essentially of a pair of stainless steel layers sandwiched together with epoxy and patterned to obtain desired mechanical and electrical properties.

The disk-facing layer of steel, which is preferably gold-coated to enhance conductivity, is shown in FIG. 7B as fashioned into a pair of conductors 121 and 122 that are patterned adjacent to the head platform 124 to allow gimbal movement of the head or slider, not shown, which is to be attached to the platform. The conductors 121 and 122 are patterned in the hinge area 118 to cover and therefore add to the stiffness of a brace 128, except for a small electrically insulative gap between the conductors. An island 129 of the conductive layer remains disposed between the conductors 121 and 122 in the middle of the beam 125 in order to reduce the area and therefore the capacitance between the conductors and the steel stiffener layer without significantly reducing the strength of the beam or increasing the inductance of the circuit formed by the conductors.

The side of the suspension 120 designed to face away from its associated disk is shown in FIG. 7A to have portions of the stiffener layer between the beam 125 and the mounting area 127 cut away by sawing or etching, thus forming a pair of thin, longitudinal strips 130 and 133, the strips being flexible due to their limited width and extended length, so that the strips have a low bending stiffness. Extending laterally between and connecting the strips 130 and 133 is a torsionally stiff brace 128, which is stiff, in part, due to its longitudinal as well as its lateral extent, much as the entire hinge region would be stiff if nothing had been cut out. The brace 128 is connected to the hinge strips 130 and 133 by a pair of bridges 137 and 138, which are longitudinally reduced in order to limit their constraint of bending by the hinge strips. Spaces between the brace 128 and hinge strips 130 and 133 are made as thin as possible while maintaining operational clearance between the strips 130 and 133 and the brace 128, in order to minimize the lateral extent of bridges 137 and 138, so that the torsional stiffness of brace 128 transfers efficiently into a torsional stiffness of the strips. Having the brace 128 extend longitudinally much further than the bridges 137 and 138 provides the strips 130 and 133 with the torsional stiffness of the brace while minimizing the bending stiffness imparted from the brace to the strips. Tiny ribbons of conductors 121 and 122 also extend between beam 125 and mounting area 127, negligibly affecting the spring constant of the hinge region 118. A slight bend 135 in the beam 125 may be provided for assuring a parallel relationship between the beam and the disk.

Figure 8:
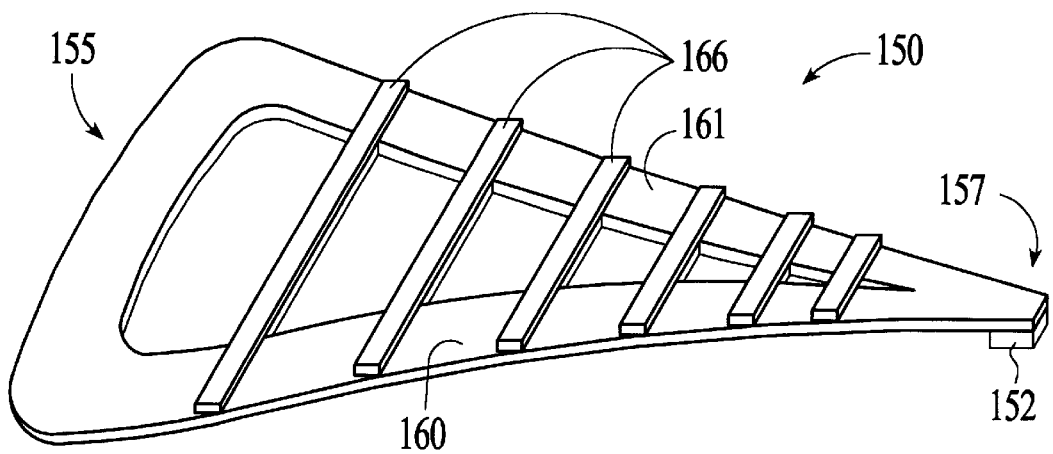
FIG. 8 is a perspective view of an information storage system suspension including a pair of bendable hinge strips crossed by a plurality of torsionally stiff braces.

FIG. 8 shows a suspension 150 for a transducer 152 which may read and/or write on a disk or tape, the suspension defined by a generally tapered outline between a mounting end 155 and a transducer end 157. The suspension 150 has a pair of laterally spaced, longitudinally extending strips 160 and 161, which are connected by a number of laterally extending, longitudinally limited, torsionally stiff braces 166. The strips 160 and 161 are thus divided into a number of segments bordered by at least one of the braces 166. Each brace 166 holds adjoining strip 160 and 161 segments from sloping upward at one strip and downward at another, and thus imparts a torsional stiffens to the tapered suspension 150. At the same time, the braces 166 allow the strips 160 and 161 to bend up or down in unison at each segment, thereby providing flexibility for the transducer to bend in a direction perpendicular to the strips and braces. The segmented suspension 150 may be conveniently produced by semiconductor processing techniques of masking and etching, for instance, of a silicon wafer upon which a silicon carbide layer has been formed, the silicon patterned to form the braces 166 and the silicon carbide forming the strips 160 and 161. A plurality of conductive leads may be deposited on a media facing side of the suspension, and connected to the transducer in a contiguous or gimbaled manner.

Figure 9:
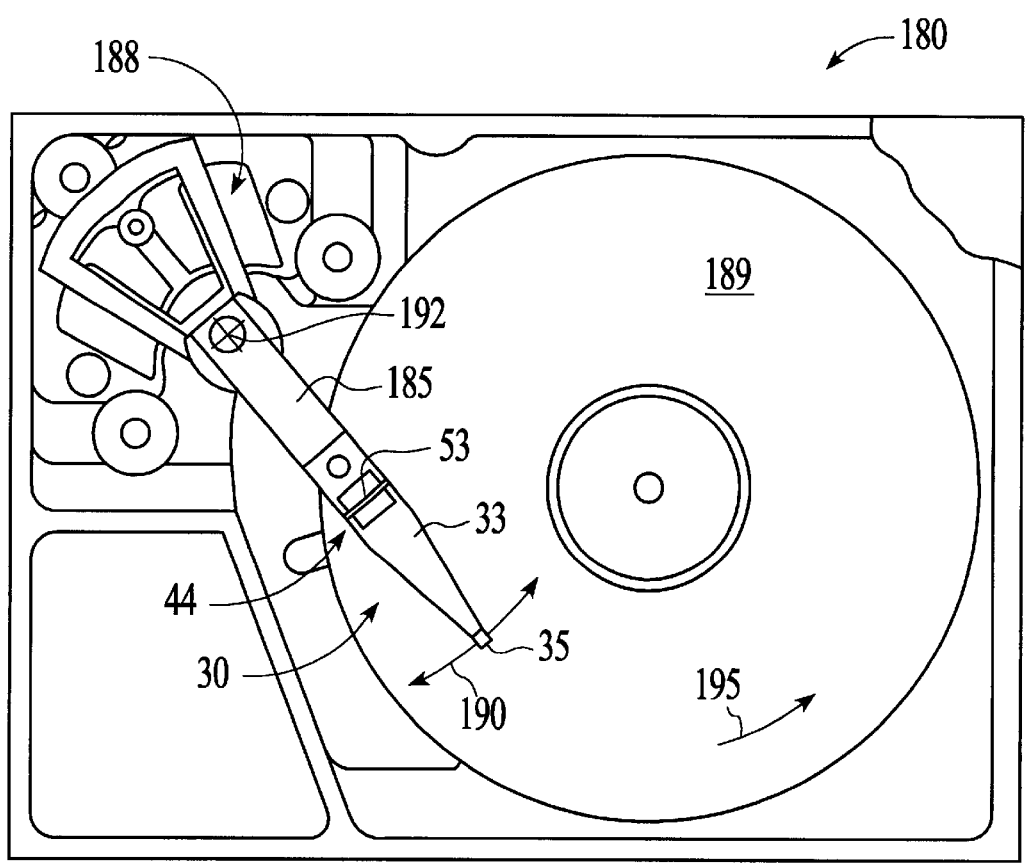
FIG. 9 is an opened top view of a disk drive including a suspension of FIG. 1.

FIG. 9 gives an overview of a torsionally stiff, vertically flexible suspension 30 of FIG. 1 as employed within a hard disk drive 180. The suspension is attached at its mounting end to an member 185 of a rotary actuator 188, so that the head 35 can access various tracks of a disk surface 189 as shown by arrow 190, while the member pivots about axis 192. The disk surface 189 is spinning rapidly in a direction of arrow 195, demanding flexibility of the arm 33 in the direction toward and away from the disk surface 189 in order to accommodate any asperities or waviness of the disk surface without damage to the head, which may be within a few microinches of that surface. This vertical flexibility is afforded by hinge region 44, while torsionally stiff brace 53 prevents unwanted torsional motion of the suspension. Although not shown, similar torsionally stiff and vertically flexible suspensions may be employed in disk drives having linear acuators or in servo controlled tape drives.

What is claimed is:

1. A suspension for an information storage system head, comprising:

a beam extending generally in a longitudinal direction from a mounting end to a transducer end and extending further in a lateral direction than in a direction perpendicular to said lateral and longitudinal directions, said mounting end being held relatively fixed in said perpendicular direction with at least said transducer end being actuable in at least one of said lateral and longitudinal directions, said beam defining a laterally extensive region of perpendicular flexibility with laterally opposed sections of said region being attached to a torsionally stiff brace extending much further in said lateral direction than a longitudinal extent of said attachment to said sections, with said brace longitudinally dividing said region of perpendicular flexibility, wherein said beam has a flexibility in moving said transducer end relative to said mounting end which is substantially greater in said perpendicular direction than in said lateral and longitudinal directions and has a preferentially increased torsional stiffness about a longitudinal axis compared to a bending stiffness in said perpendicular direction.

2. The suspension of claim 1 wherein said region of perpendicular flexibility is divided into laterally separated portions.

3. The suspension of claim 1 wherein said torsionally stiff brace is a tube.

4. The suspension of claim 1 wherein said torsionally stiff brace has a generally rectangular cross-section at a given lateral coordinate.

5. The suspension of claim 1 wherein said torsionally stiff brace has a generally triangular cross-section at a given lateral coordinate.

6. The suspension of claim 1 wherein said torsionally stiff brace has a generally oblong cross-section at a given lateral coordinate.

7. The suspension of claim 1 wherein said torsionally stiff brace has a generally U-shaped cross-section at a given lateral coordinate.

8. The suspension of claim 1 wherein said beam has a plurality of laterally extending, torsionally stiff braces, including said torsionally stiff brace and attached to said laterally extensive region of perpendicular flexibility.

9. The suspension of claim 1 wherein said beam is actuable about a pivot disposed near said mounting end.

10. The suspension of claim 1 wherein said beam has a maximum perpendicular dimension at said brace.

11. A suspension for a disk-drive head comprising:
a beam cantilevered generally along an X direction between a mounting end and a transducer end, extending in a Y direction generally further than in a Z direction, said X, Y and Z directions being orthogonal, said mounting end being generally fixed in said Z direction with said transducer end actuable in at least one of said X and Y directions, said beam being flexible in a plurality of sections that are spaced apart in said X and Y directions and joined by a brace extending in said Y direction, said brace being torsionally stiff about said Y direction, such that said brace affords said beam an overall flexibility in said Z direction and provides an increased torsional stiffness about said X direction.

12. The suspension of claim 11 wherein said beam has a maximum Z dimension at said brace.

13. The suspension of claim 11 wherein said brace includes a layer removed from another region of said beam.

14. The suspension of claim 11 wherein said brace has a triangular cross-section along a plane including said X and said Z directions.

15. The suspension of claim 11 wherein said brace has a rectangular cross-section along a plane including said X and said Z directions.

16. The suspension of claim 11 wherein said brace has a generally elliptical cross-section along a plane including said X and said Z directions.

17. The suspension of claim 11 wherein said brace has a flange extending along said Y direction.

18. The suspension of claim 11 wherein said brace has a smallest longitudinal extent at a connection of said brace to at least one of said sections.

* * * * *